(12) United States Patent
Hwang et al.

(10) Patent No.: US 8,109,718 B2
(45) Date of Patent: Feb. 7, 2012

(54) CENTRIFUGAL BLOWER

(75) Inventors: Ching-Bai Hwang, Tu-Cheng (TW); Jui-Wen Hung, Tu-Cheng (TW)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 1209 days.

(21) Appl. No.: 11/840,181

(22) Filed: Aug. 16, 2007

(65) Prior Publication Data

US 2009/0010757 A1 Jan. 8, 2009

(30) Foreign Application Priority Data

Jul. 4, 2007 (CN) .......................... 2007 1 0076389

(51) Int. Cl.
*F04D 29/58* (2006.01)
(52) U.S. Cl. ........ 415/176; 415/102; 415/204; 415/206; 415/213.1; 415/214.1; 361/679.48; 361/695
(58) Field of Classification Search .................. 415/102, 415/175–178, 204, 206, 213.1, 214.1; 361/695–697, 361/679.48, 679.49, 679.5, 679.51
See application file for complete search history.

(56) References Cited

U.S. PATENT DOCUMENTS

| | | | |
|---|---|---|---|
| 5,997,246 A * | 12/1999 | Humbad | 415/204 |
| 6,345,664 B1 * | 2/2002 | Katsui | 165/80.3 |
| 6,540,476 B2 * | 4/2003 | Huang et al. | 415/102 |
| 6,665,181 B2 * | 12/2003 | Tanaka et al. | 361/695 |
| 6,813,149 B2 * | 11/2004 | Faneuf et al. | 361/679.49 |
| 7,414,850 B2 * | 8/2008 | Hung | 361/679.48 |
| 2003/0142476 A1 * | 7/2003 | Tomioka et al. | 361/695 |
| 2006/0110249 A1 * | 5/2006 | Williams et al. | 415/206 |
| 2007/0251675 A1 * | 11/2007 | Hwang et al. | 165/104.33 |

FOREIGN PATENT DOCUMENTS

| | | |
|---|---|---|
| JP | 2006-9669 | 1/2006 |
| TW | 316688 | 9/1997 |
| TW | I256442 | 6/2006 |

\* cited by examiner

*Primary Examiner* — Christopher Verdier
(74) *Attorney, Agent, or Firm* — Altis Law Group, Inc.

(57) ABSTRACT

A centrifugal blower (10) includes a casing (12) and a rotor (14) rotatable disposed in the casing. The casing includes a base plate (121), a sidewall (122) extending from the base plate and a cover (123) covering the sidewall. The sidewall is a multilayer structure and includes a first section (128a) and a second section (128c). A distance between a central axis (A) of the rotor and an inner surface of the second section is greater than that between the central axis of the rotor and an inner surface of the first section. The first section is located below a mother board (20) and the second section sits on a top surface of the motherboard when the centrifugal blower is mounted to the mother board.

1 Claim, 6 Drawing Sheets

CENTRIFUGAL BLOWER

BACKGROUND OF THE INVENTION

1. Field of the Invention

The present invention relates generally to centrifugal blowers, and more particularly to a centrifugal blower which can provide a large amount of airflow while be compactly received in a portable electronic device.

2. Related Art

It is well known that heat is generated during operations of a variety of electronic components, such as integrated circuit chips. To ensure normal and safe operations, cooling devices such as centrifugal blowers are often employed to dissipate the generated heat away from these electronic components.

As progress continues to be made in the electronics area, more components are accommodated on the same real estate and generate more heat. The centrifugal blowers used to cool these electronic components are accordingly made as large as possible in order to possess higher heat removal capacities. That is, a sidewall of a casing of the centrifugal blower or a diameter of a rotor of the centrifugal blower is increased, which causes the centrifugal blowers to occupy more space in electronic products. The sizes of the electronic products are accordingly increased, which violates the compact size requirements for the electronic products. Thus, there is a need to provide centrifugal blowers having higher heat removal capacities, but with the sizes of the electronic products accommodating the centrifugal blowers therein not increasing.

SUMMARY OF THE INVENTION

The present invention relates, in one aspect, to a centrifugal blower. The centrifugal blower includes a casing and a rotor rotatably disposed in the casing. The casing includes a base plate, a sidewall extending from the base plat; and a cover covering the sidewall. The sidewall is a multilayer structure and includes a first section and a second section. A distance between a central axis of the rotor and an inner surface of the second section is greater than that between the central axis of the rotor and an inner surface of the first section. Accordingly, the centrifugal blower can be compactly received in a portable electronic device with the first section located below a printed circuit board of the electronic device and the second section having a portion sitting on the printed circuit board. Thus, the size of the centrifugal fan can be increased while being compactly accommodated in the portable electronic device.

Other advantages and novel features of the present invention will become more apparent from the following detailed description of first embodiments when taken in conjunction with the accompanying drawings, in which:

DETAILED DESCRIPTION OF THE INVENTION

Figure 1:
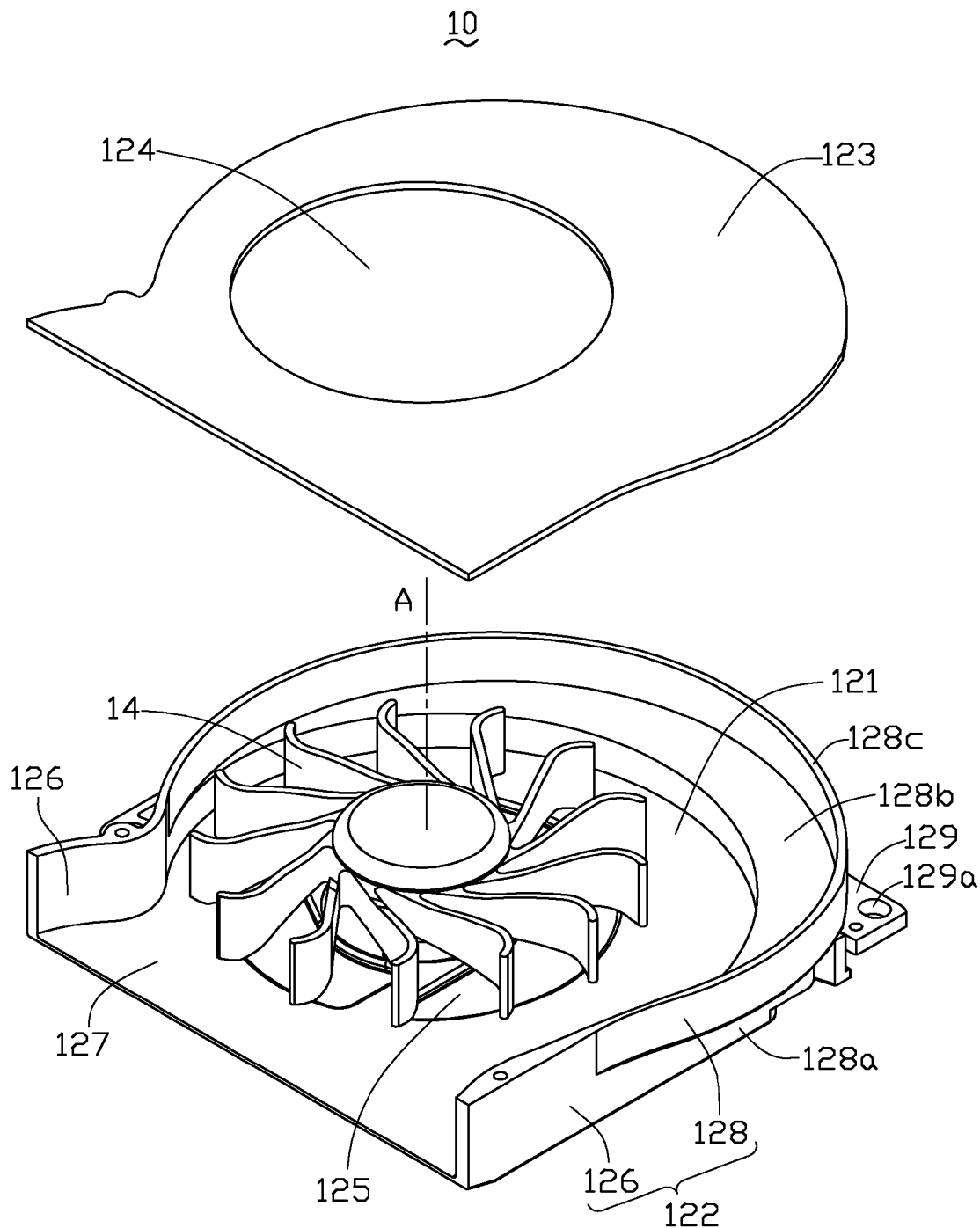
FIG. 1 is an exploded, isometric view of a centrifugal blower in accordance with a preferred embodiment of the present invention.
Figure 2:
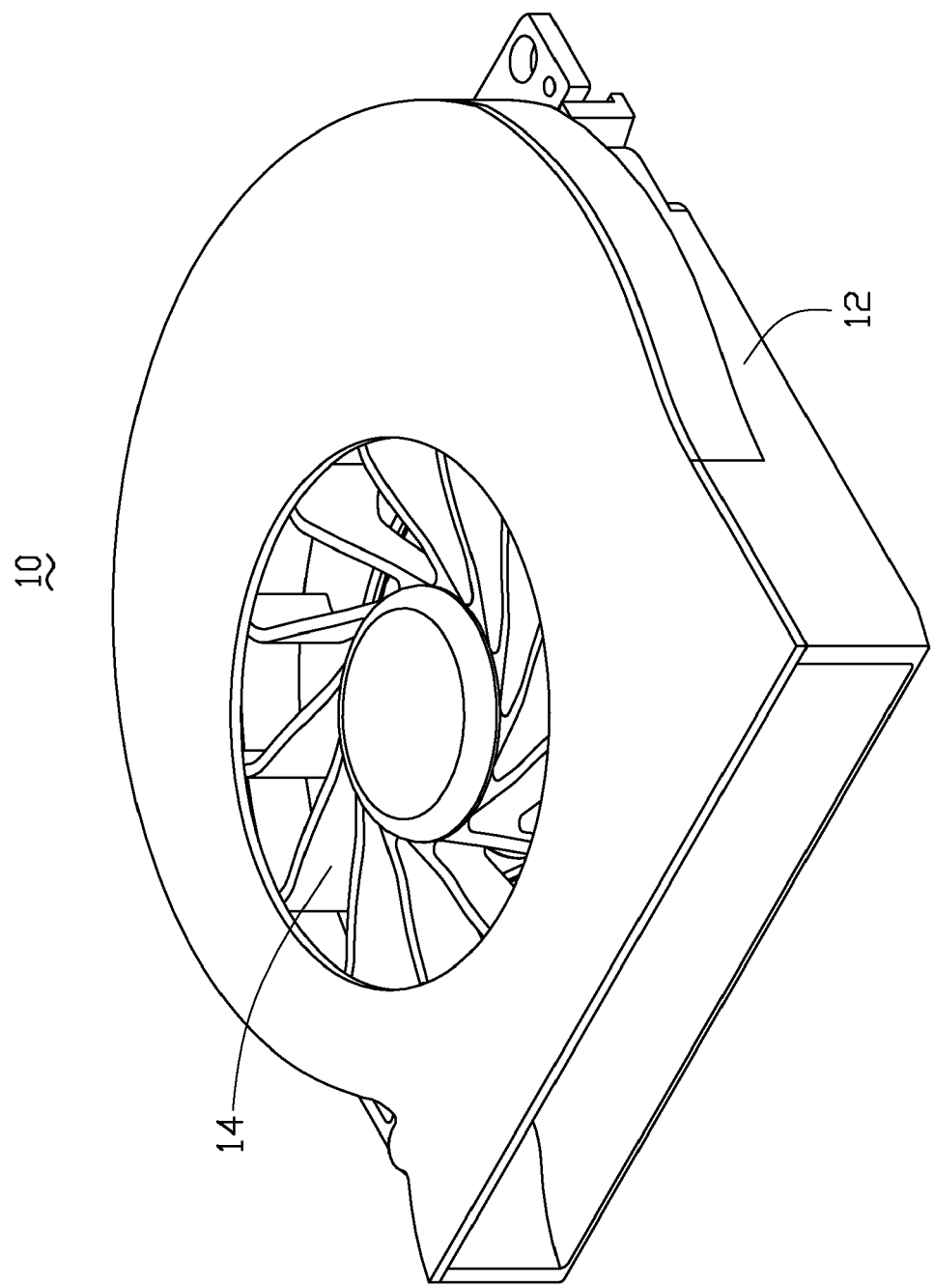
FIG. 2 is an assembled view of the centrifugal blower of FIG. 1.
Figure 3:
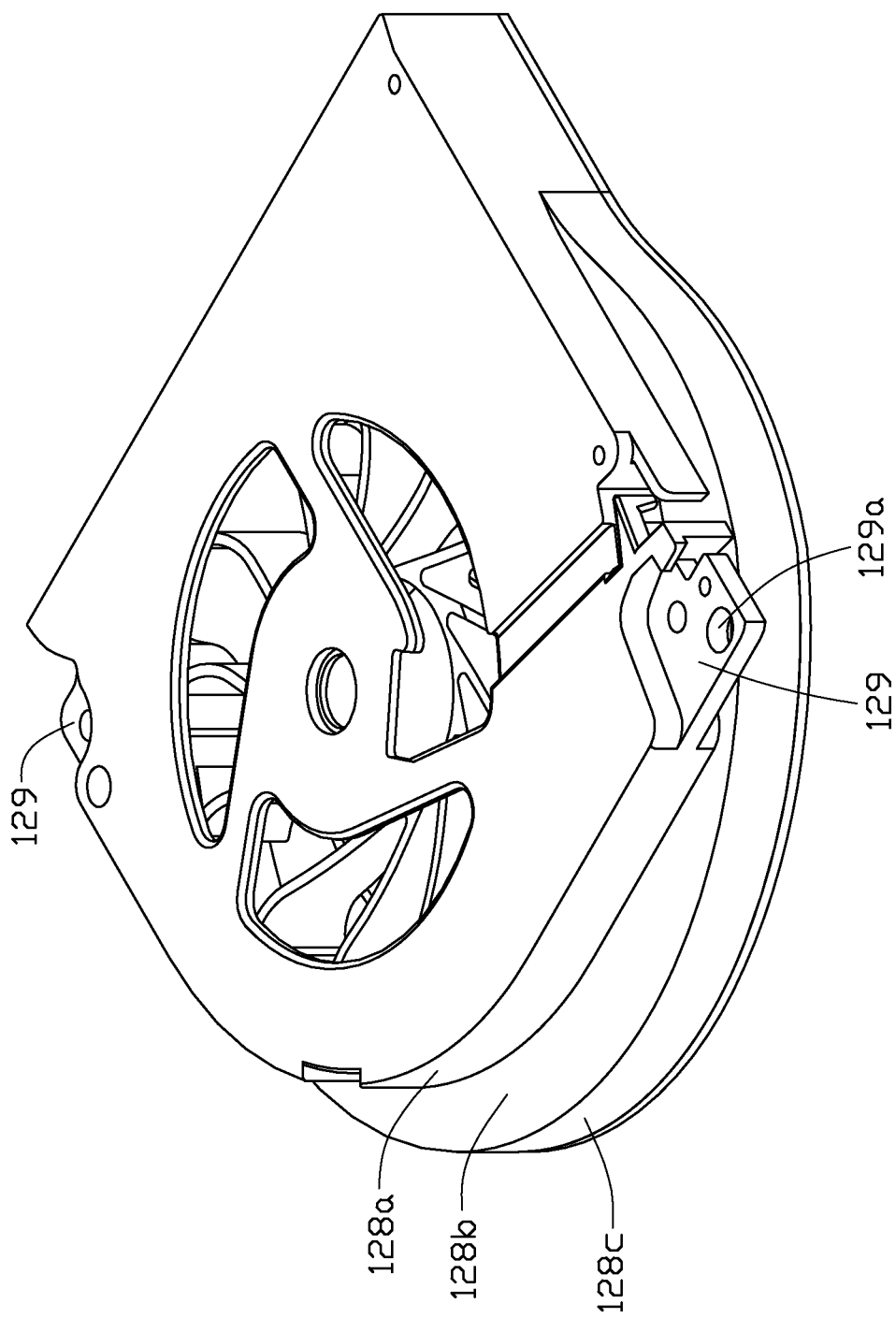
FIG. 3 is similar to FIG. 2 but viewed from another aspect.
Figure 4:
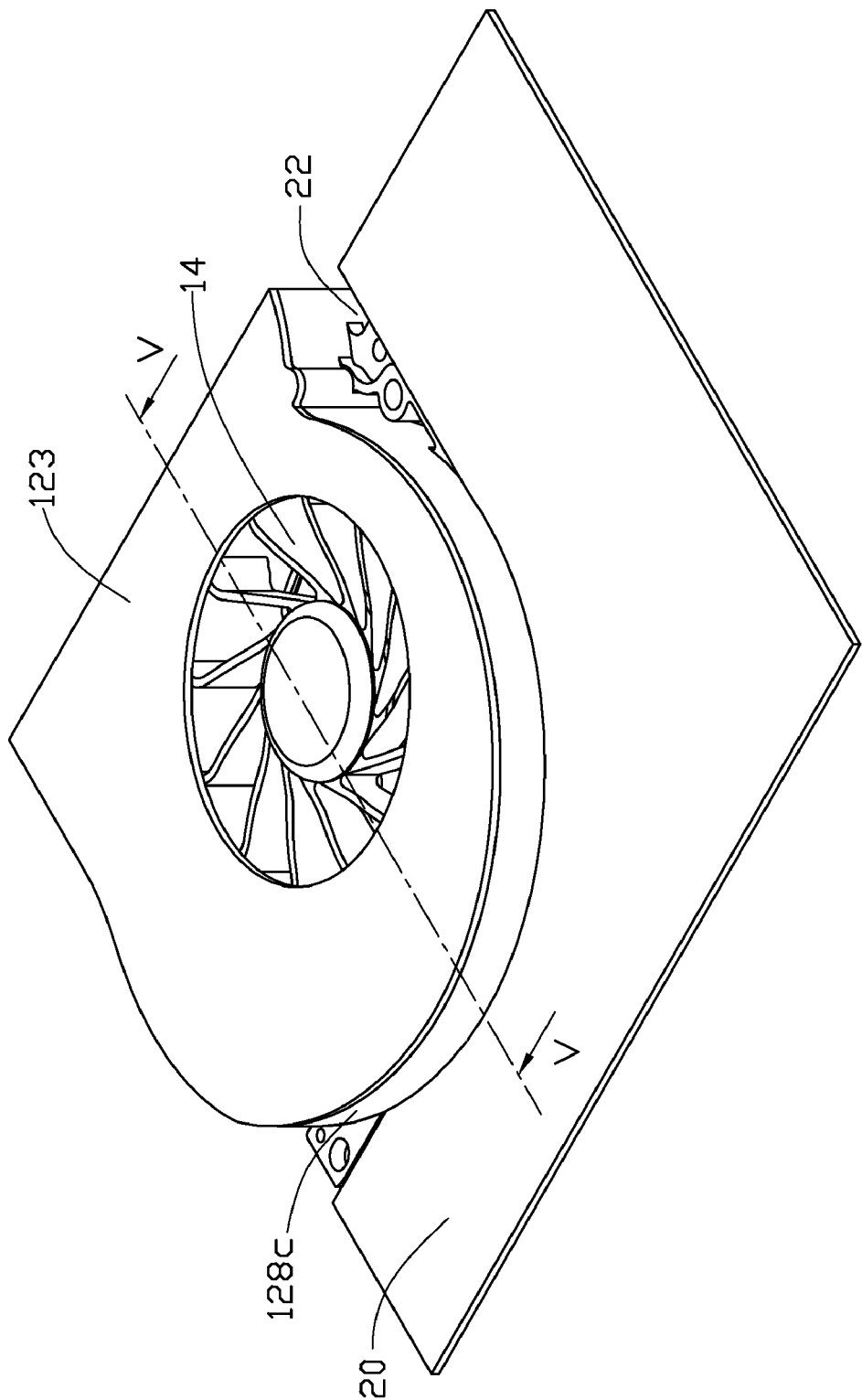
FIG. 4 is an assembled view of the centrifugal blower and a mother board.
Figure 5:
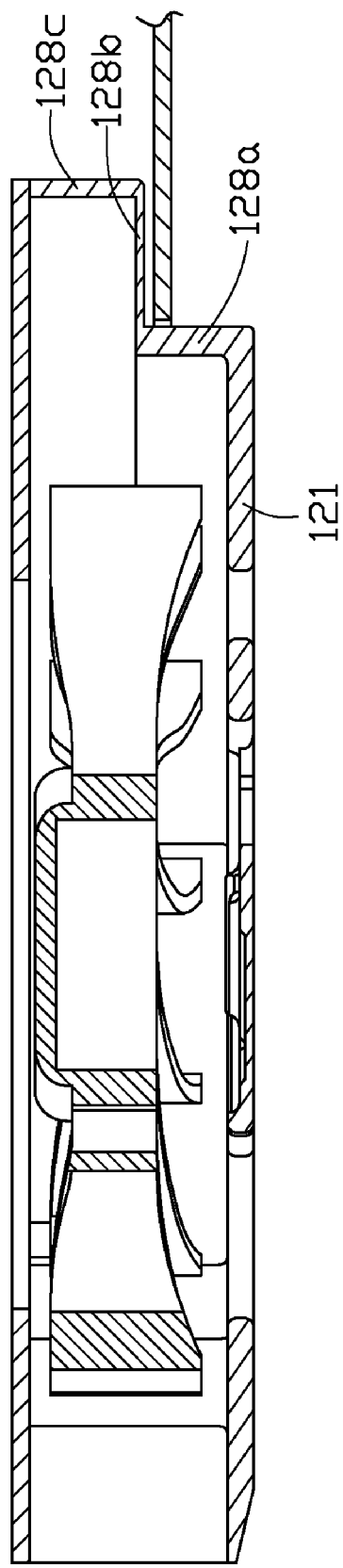
FIG. 5 is a cross sectional view of FIG. 4, taken along line V-V thereof.

Reference will now be made to the drawing figures to describe the first embodiment in detail.

Referring to FIGS. 1 to 5, a centrifugal blower 10 in accordance with a preferred embodiment of the present invention is shown. The centrifugal blower 10 is mounted to a motherboard 20 of an electronic product such as a laptop computer, and includes a casing 12 (shown in FIG. 2) and a rotor 14 disposed in the casing 12.

The casing 12 includes a planar base plate 121, and a substantially U-shaped sidewall 122 extending upwardly from a periphery of the base plate 121 and a top cover 123 covering the sidewall 122. The base plate 121 and the top cover 123 respectively define an air inlet 124, 125 therein. The rotor 14 is disposed in a space formed between the base plate 121, the sidewall 122 and the top cover 123. The sidewall 122 includes two opposite walls 126 which define an air outlet 127 therebetween, and a volute shell 128 which is located between and connects with the opposite walls 126. A distance between a central axis A of the rotor 14 and an inner surface of the volute shell 128 gradually decreases along a counterclockwise direction so as to increase pressure of the air when it is driven by the rotor 14 to leave the air outlet 127. The volute shell 128 has a step-shaped configuration. The volute shell 128 has a double-layer structure, and includes a first section 128a (bottom section) perpendicularly and upwardly extending from the periphery of the base plate 121, a third section 128b horizontally and outwardly extending from a top of the first section 128a, and a second section 128c perpendicularly and upwardly extending from a periphery of the third section 128b. That is, the second section 128c offsets outwardly with respect to the first section 128a. A distance between the central axis A of the rotor 14 and points of an inner surface of the second section 128c of the volute shell 128 is greater than that between the central axis A and corresponding points of an inner surface of the first section 128a. The second section 128c is larger than and surrounds the first section 128a. Particularly referring to FIG. 3, the first section 128a of the volute shell 128 extends two platforms 129 outwardly and parallel to the third section 128b of the volute shell 128. Each of the platforms 129 defines a through hole 129a therein so as to extend a screw (not shown) therethrough to screw the centrifugal blower 10 onto a housing (not shown) of the electronic product.

In assembly of the centrifugal blower 10 to the motherboard 20, the motherboard 20 is placed in the housing of the electronic product. The centrifugal blower 10 is perpendicularly positioned to and received in an opening 22 of the motherboard 20. Two screws (not shown) are brought to extend through the through holes 129a of the platforms 129 and be screwed into the housing of the electronic product thereby securing the centrifugal blower 10 in the housing of the electronic product. Therefore, the second and third sections 128c, 128b are positioned above the motherboard 20, and the third portion 128b contacts with a part of a top face of the mother board 20 surrounding the opening 22. The first section 128a is received in the opening 22 of the motherboard 20 and located below the motherboard 20. An upper part of the first section 128a faces an edge (not labeled) of the motherboard 20.

In the present centrifugal blower 10, the second section 128c of the volute shell 128 offsets outwardly with respect to the first section 128a of the volute shell 128 and locates above the first section 128a. Therefore, the present centrifugal blower 10 generates more airflow than a conventional monolayer centrifugal blower, which does not have a lower space defined by the first section 128a of the present centrifugal blower 10. The present invention uses a space of the electronic product below the motherboard 20 to extend downwardly the first section 128a to thereby increase an internal space surrounded by the casing 12. Thus, the centrifugal blower 10 can generate an airflow with a larger volumetric flow rate. Moreover, since the space below the motherboard 20 generally is an idle space which does not accommodate any component therein, the present invention will not affect the layout of the components of the electronic product and increase the size of the electronic product while can increase the cooling effectiveness of the centrifugal blower 10.

Figure 6:
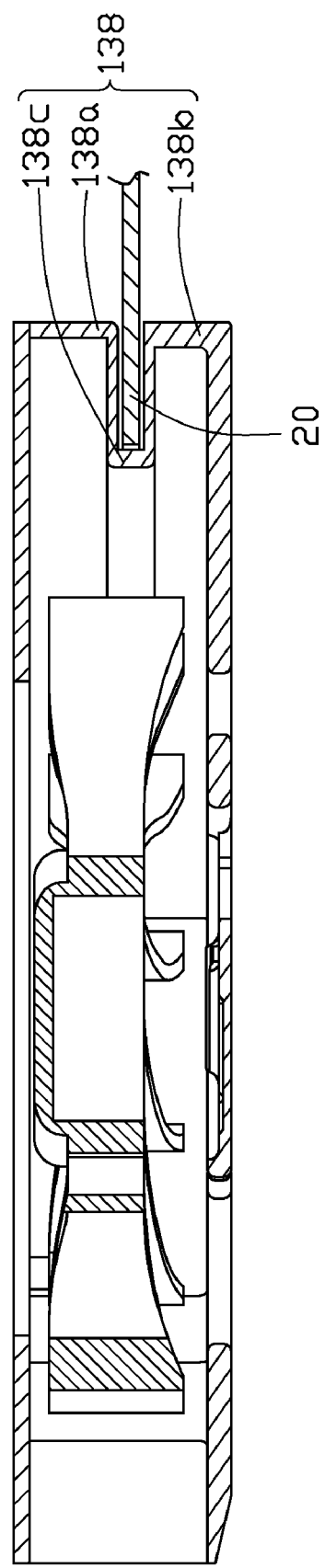
FIG. 6 is a cross sectional view of an assembly of a motherboard and a centrifugal blower in accordance with a second embodiment of the present invention.

Referring to FIG. 6, a second embodiment of the present centrifugal blower 10 is shown. In this embodiment, the volute shell 138 of the centrifugal blower 10 has a three-layer structure with top section 138a and bottom section 138b offsetting outwardly with respect to a middle section 138c. A distance between the central axis A of the rotor 14 and an inner surface of the top/bottom section 138a/138b is greater than that between the central axis A of the rotor 14 and an inner surface of the middle section 138c. In the second embodiment, the centrifugal blower 10 is inserted into the motherboard 20 along a direction parallel to the motherboard 20. A part of the motherboard 20 is sandwiched between the top section 138a and the bottom section 138b of the volute shell 138 before the motherboard 20 and the centrifugal blower 10 are placed in the housing of the electronic product. An edge of the motherboard 20 faces the middle section 138c of the volute shell 138. The volumetric flow rate of the centrifugal blower 10 of this second embodiment is larger than that of the first embodiment, since the size of the lower portion of the centrifugal blower 10 defined by the bottom section 138c is extended to a position located below and contacting a portion of a bottom face the motherboard 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A combination comprising:
   a printed circuit board having a top surface, a bottom surface opposite the top surface and an edge between the top and bottom surfaces, and
   a centrifugal blower attached to the printed circuit board, the centrifugal blower having a base plate, a sidewall extending upwardly from the base plate, and a rotor rotatably mounted on the base plate and surrounded by the sidewall;
   wherein the sidewall of the centrifugal blower has a first section facing the edge of the printed circuit board, a second section over a part of the top surface of the printed circuit board, and a third section located below the first section and extended to a position below a part of the bottom surface of the printed circuit board whereby the second section and the third section of the sidewall of the centrifugal blower sandwich a art of the printed circuit board therebetween.

* * * * *